Sept. 15, 1964  L. G. KITCHEN  3,148,966
AUTOMATIC CONTROLS FOR THE LIQUEFACTION AND SEPARATION OF GASES
Filed Aug. 23, 1962
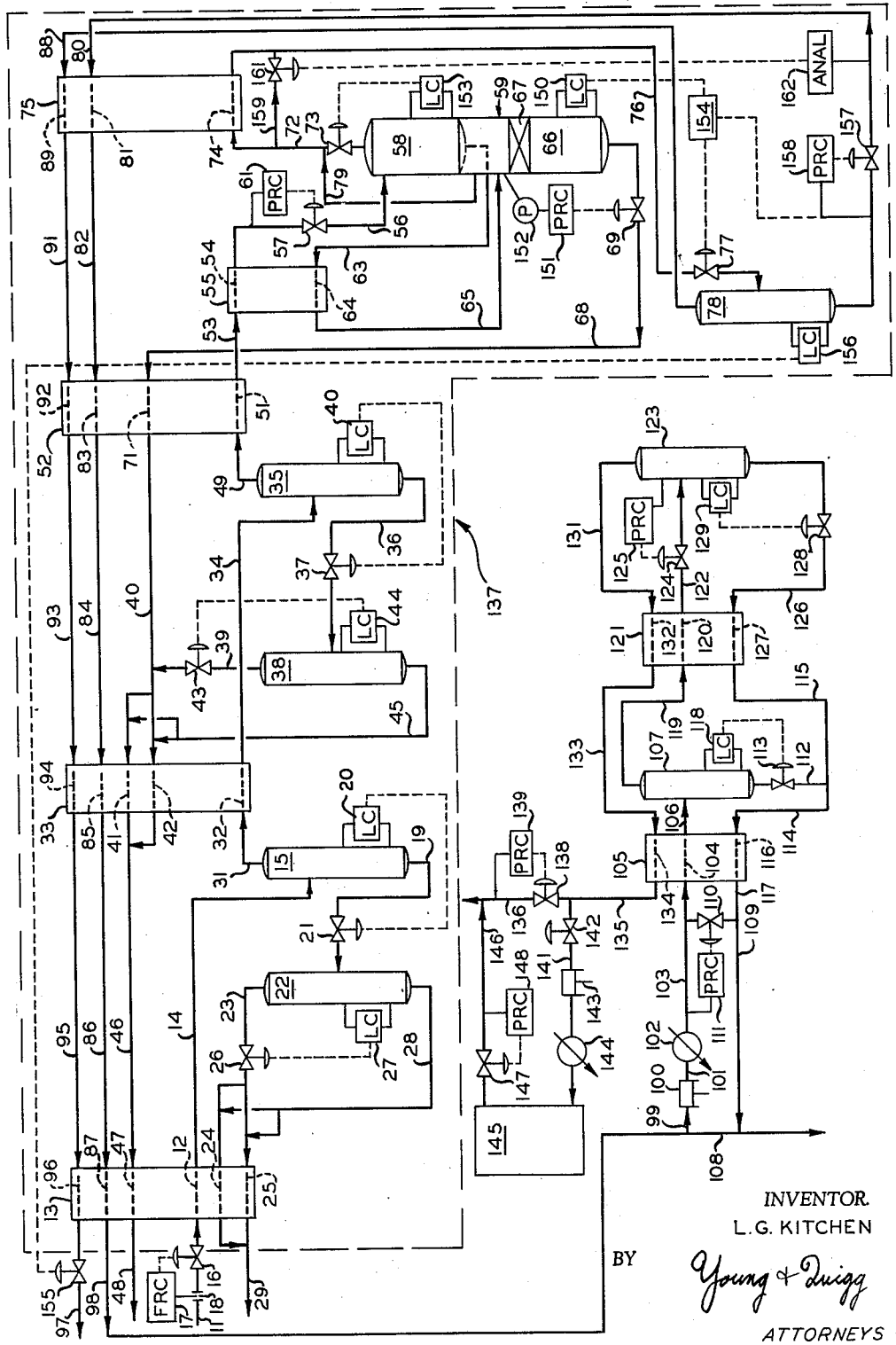
INVENTOR.
L.G. KITCHEN
BY  *Young & Quigg*
ATTORNEYS

United States Patent Office 3,148,966
Patented Sept. 15, 1964

3,148,966
AUTOMATIC CONTROLS FOR THE LIQUEFACTION AND SEPARATION OF GASES
Leland G. Kitchen, Bartlesville, Okla., assignor to Phillips Petroleum Company, a corporation of Delaware
Filed Aug. 23, 1962, Ser. No. 218,985
12 Claims. (Cl. 62—21)

This invention relates to method and apparatus for separating gases. In one aspect the invention relates to method and apparatus for the recovery of helium from a helium-containing gas. In a further aspect the invention relates to a control system for utilization in the recovery of helium from natural gas. In a still further aspect the invention relates to method and apparatus for controlling the separation of gases.

The value of helium as an inert atmosphere, a component of an artificial breathing medium, a lifting gas, and other diverse uses has been known. The world supply of naturally-available helium is limited to very few geographical locations, most of which are within the continental United States, and is further limited so far as is presently known as being a minor constituent of natural gas. Various efforts have been made in the past to recover the helium from such a gas mixture economically, and have met with greater or lesser success.

It is an object of this invention to provide a method and apparatus for separating a gas mixture. It is another object of this invention to provide economical method and apparatus for recovering helium from a gas mixture containing helium. It is a further object of the invention to provide improved method and apparatus for the recovery of various constituents from natural gas, such as natural gas liquids, helium, and nitrogen. It is a further object of this invention to provide method and apparatus for the separation of various constituents of natural gas without requiring external refrigeration. Yet another object of the invention is to provide an improved control system for utilization in the recovery of one or more components from natural gas. A still further object of the invention is to provide a new control system for the recovery of helium from natural gas. Another object of the invention is to provide method and apparatus for controlling a process for separating a gas mixture.

Other aspects, objects and advantages of the invention will be apparent from a study of the disclosure, the drawing and the appended claims to the invention.

In the separation of helium from hydrocarbon it is desirable to approach equilibrium when there is a flashing of a liquefied mixture of gases. By the practice of this invention a more nearly equilibrium of the separation of the gases from the liquid is obtained. Thus in a process for separation of a mixture of gases wherein the mixture is cooled to liquefy a portion thereof, the thus cooled mixture is introduced into a first separation zone, liquid is removed from said first separation zone, uncondensed gases are withdrawn from said first separation zone and cooled to liquefy a portion thereof, and the thus cooled gases are introduced into a second separation zone, the invention provides an improved means and method of control comprising controlling the rate of withdrawal of liquid from said first separation zone responsive to the pressure in said first separation zone, and controlling the rate of introduction of the thus cooled gases into said second separation zone responsive to the liquid level in said first separation zone during normal operation and responsive to the pressure in said second separation zone during start up procedures or system upsets.

Referring now to the drawing there is shown a diagrammatic representation of a helium recovery system utilizing the present invention. A feed gas comprising helium, nitrogen and $C_1$ to $C_5$ hydrocarbons is passed through line 11 into and through flow path 12 of heat exchanger 13 wherein the feed gas is substantially cooled. The thus cooled gas is passed through line 14 into liquid gas separator 15. The flow of gas through line 11 can be maintained substantially constant by means of a valve 16 which is located in line 11 and which is controlled by flow rate controller 17 responsive to the differential pressure across an orifice 18 located in line 11. The liquid, which is predominantly $C_1$ to $C_5$ hydrocarbons with a small amount of nitrogen, in liquid gas separator 15 is withdrawn therefrom by way of line 19. The rate of flow through line 19 can be controlled to maintain the liquid level in separator 15 substantially constant by means of a throttle valve 21 which is actuated by liquid level controller 20. It is desirable that the liquefied gases in line 19 be passed in heat exchanging relationship with additional feed gas in line 11 to recover the refrigeration power contained in the liquefied gas. For the most efficient recovery of the refrigeration power it is desirable that the liquefied gases in line 19 be substantially completely vaporized as they pass through heat exchanger 13; however, when the pressure on the liquefied gases in line 19 is reduced to a pressure at which the liquefied gases will be substantially vaporized when passing through heat exchanger 13, a phase separation occurs. Previously, difficulties have been encountered in attempting to pass a two phase fluid through a heat exchanger due to the maldistribution of liquid and vapor and the resulting unequal distribution of heat. However, in accordance with the invention disclosed in U. S. application Serial No. 203,859, filed by E. A. Harper, F. N. Hull and J. T. Karbosky on June 20, 1962, the liquefied gases in line 19 are passed through valve 21, which functions to reduce the pressure on the liquefied gases down to a value at which substantially all of the liquefied gases will be vaporized as they pass through the heat exchanger, and into phase separator 22. The flashed vapors are withdrawn from separator 22 by way of line 23 and are passed through flow paths 24 and 25 of heat exchanger 13. The rate of flow through line 23 can be controlled by means of valve 26 which is actuated by liquid level controller 27 responsive to the liquid level in separator 22 as a means of maintaining the pressure of the flashed vapors downstream of valve 26 slightly lower than the pressure of the flashed liquid. The flashed liquid is withdrawn from separator 22 by way of line 28 and is introduced into flow paths 24 and 25 in such a manner that the ratios of liquid and vapor passing through each of the flow paths 24 and 25 are substantially the same. Substantially all of the liquid passing through flow paths 24 and 25 is vaporized by the transfer of heat thereto from the feed stream passing through flow path 12. The effluent from flow paths 24 and 25 is combined and withdrawn from the system by way of line 29. While any suitable apparatus can be utilized for evenly distributing the liquid and vapor through flow paths 24 and 25, the presently preferred apparatus is disclosed and claimed in said copending application by E. A. Harper, F. N. Hull and J. T. Karbosky.

The vapors, which comprise substantially all of the helium and the major portion of the nitrogen contained in the feed gas stream with the remainder being primarily $C_1$ hydrocarbons with a small amount of $C_2$ to $C_5$ hydrocarbons, from liquid gas separator 15 are withdrawn by way of line 31 and passed into and through flow path 32 of heat exchanger 33 wherein the vapors are substantially cooled. The thus cooled vapors are passed through line 34 into liquid gas separator 35. The liquid, which is primarily $C_1$ hydrocarbons together with substantially all of the $C_2$ to $C_5$ hydrocarbons passing through line 34 along with a minor portion of the nitrogen, is withdrawn from separator 35 and passed by way of line 36 and throttling valve 37 into phase separator 38. The rate of flow through line 36 can be controlled by means of liquid level controller 40 which actuates valve 37 responsive to the liquid level in separator 35. The flashed vapors are withdrawn from separator 38 by way of line 39 and are passed through flow paths 41 and 42 of heat exchanger 33. A vapor stream, obtained as hereinafter described, comprising primarily nitrogen and $C_1$ hydrocarbons, is introduced into line 39 by way of line 40. The rate of flow of vapors through line 39 can be controlled by means of valve 43 which is actuated by liquid level controller 44 responsive to the liquid level in separator 38 as a means of maintaining the pressure of the flashed vapors downstream of valve 43 slightly lower than the pressure of the flashed liquid in separator 38. The flashed liquid is withdrawn from separator 38 by way of line 45 and is introduced into flow paths 41 and 42 in such a manner that the ratios of the liquid and vapors passing through each of flow paths 41 and 42 are substantially the same. Substantially all of the liquid passing through flow paths 41 and 42 is vaporized by the transfer of heat thereto from the fluid passing through flow path 32. The vaporized effluent from flow paths 41 and 42 is combined and passed by way of line 46 into and through flow path 47 of heat exchanger 13 and then withdrawn from the system by way of line 48. The gas in line 48 can be recovered and used as a residue gas.

The vapors, which comprise primarily helium, nitrogen and $C_1$ hydrocarbons, are withdrawn from liquid gas separator 35 and passed by way of line 49 into and through flow path 51 of heat exchanger 52 and line 53 into and through flow path 54 of heat exchanger 55, wherein the vapors are further cooled. The thus cooled vapors are passed by way of line 56 and valve 57 into chamber 58 of column 59. Valve 57 can be manipulated by pressure recorder controller 61 responsive to the pressure in line 56 upstream of valve 57 to maintain such pressure substantially constant. Liquid is withdrawn from chamber 58, which acts as a liquid gas separator, and is passed by way of line 63 into and through flow path 64 of heat exchanger 55, wherein the liquid is heated, and then through line 65 into an upper portion of chamber 66 of column 59. A stripping element 67 is positioned in chamber 66 below the entry therein of line 65 to provide for greater separation of the gas phase from the liquid phase. Element 67 can be any suitable material such as metal pall rings, saddles, and the like. Vapor-liquid contacting devices, such as bubble cap and sieve trays can also be utilized for element 67. The liquid is withdrawn from chamber 66 by way of line 68 and valve 69 into and through flow path 71 of heat exchanger 52 and then through line 40 into line 39 wherein it is admixed with the flashed vapors of separator 38 as previously described. The vapors from chamber 58 are withdrawn by way of line 72 and passed through valve 73 into and through flow path 74 of heat exchanger 75 and then through line 76 and valve 77 into separator 78, while the vapors from chamber 66 are withdrawn by way of line 79 and introduced into line 72 downstream of valve 73 and upstream of heat exchanger 75. The liquid, which is substantially nitrogen and $C_1$ hydrocarbons with a very small amount of helium, is withdrawn from separator 78 and passed in series through line 80 into and through flow path 81 of heat exchanger 75, through line 82 into and through flow path 83 of heat exchanger 52, through line 84 into and through flow path 85 of heat exchanger 33, through line 86 and into and through flow path 87 of heat exchanger 13. The vapors which are primarily helium and nitrogen, are withdrawn from separator 78 and passed by way of line 88 into and through flow path 89 of heat exchanger 75, through line 91 into and through flow path 92 of heat exchanger 52, through line 93 into and through flow path 94 of heat exchanger 33, through line 95 into and through flow path 96 of heat exchanger 13 and is withdrawn from the system by way of line 97 as a concentrated helium product.

The effluent from flow path 87 of heat exchanger 13, which comprises primarily nitrogen and $C_1$ hydrocarbons, is withdrawn through line 98 and at least a portion thereof is passed by way of line 99, compressor 100, line 101, cooler 102, line 103, flow path 104 of heat exchanger 105, and line 106 into liquid gas separator 107. The remainder of the fluid from line 98 is passed through line 108, and can be utilized as a low B.t.u. fuel in the plant fuel system or passed to another point of utility as desired. Line 109 containing valve 110 communicates between lines 103 and 108 with valve 110 being actuated by pressure recorder controller 111 responsive to the pressure in line 103 to maintain the pressure therein substantially constant. The liquid from separator 107, which comprises approximately half of the $C_1$ hydrocarbons in the feed to separator 107, is withdrawn by way of line 112 and valve 113 and is introduced into line 114 wherein it is admixed with a stream from line 115, which is obtained as hereinafter described. The resulting mixture is passed through flow path 116 of heat exchanger 105 and is then introduced into line 109 by way of line 117. The rate of flow through line 112 is regulated by valve 113 which is actuated by liquid level controller 118 responsive to the liquid level in separator 107. The vapors, which comprise a major portion of the nitrogen introduced into separator 107 along with the remainder of the hydrocarbons, are withdrawn from separator 107 through line 119, and are passed through flow path 120 of heat exchanger 121 and then through line 122 into liquid gas separator 123. The rate of flow of fluid through line 122 is manipulated responsive to the pressure in separator 123 by means of valve 124 which is actuated by pressure recorder controller 125 responsive to said pressure. The liquid, which comprises approximately 60 percent hydrocarbons and approximately 40 percent nitrogen is withdrawn from separator 123 by way of line 126 and is passed through flow path 127 of heat exchanger 121 and then through line 115 into line 114 as previously described. The rate of flow of the liquid through line 126 can be regulated by valve 128 which is actuated by liquid level controller 129 responsive to the liquid level in separator 123. The vapor effluent from separator 123, which comprises approximately 90 percent nitrogen and approximately 10 percent hydrocarbons, is withdrawn by way of line 131 and passed through flow path 132 of heat exchanger 121, line 133, and flow path 134 of heat exchanger 105. The effluent from flow path 134 is withdrawn by way of line 135 and at least a portion thereof can be passed through line 136 into insulated enclosure 137 which surrounds heat exchangers 13, 33, 52, 55 and 75 and separators 15, 22, 35, 38, 59 and 78, as well as the associated piping. The fluid passing through line 136 acts as a purging medium for insulated enclosure 137 and is maintained at a pressure slightly greater than atmospheric pressure to prevent the entry into the insulated enclosure of moisture or other materials which would freeze upon contact with the equipment in the insulated enclosure. The rate of flow of fluid through line 136 can be regulated by valve 138 which is actuated by pressure recorder controller 139 responsive to the pressure in enclosure 137. If the flow through line 135 is greater than that required for utilization as the purging medium, the remainder can be withdrawn from line 135 by way of line 141, valve 142, compressor 143 and cooler 144 into storage tank 145 or other point of utilization. If the rate of flow of fluid through line 135 is less than that desired for the purging medium, additional purging medium can be introduced into insulated enclosure 137 by way of line 146. The rate of flow of purging medium through line 146 can be manipulated by valve 147 which is actuated by pressure recorder controller 148 responsive to the pressure within the insulated enclosure 137.

As chambers 58 and 66 are operated as liquid gas separators and as the vapors from chambers 58 and 66 are the feed stream to the helium separator 78, it is desirable that a flow be maintained in all streams and that the pressure in chambers 58 and 66 be maintained within a predetermined range to eliminate any excessive pressure buildup. Prior art systems utilizing liquid level controls to regulate the withdrawal of the liquid phase and pressure controls to regulate the withdrawal of the vapors to maintain equilibrium are well known and such systems are generally suitable under normal operating conditions. However, in start up operation as well as during the occurrence of a system upset, such control systems are inadequate and oftentimes inoperative. Thus upon the occurrence of a low liquid level in chamber 58 in such a conventional system, the withdrawal of liquid from chamber 58 would be reduced or ceased thus reducing or eliminating the cooling in heat exchanger 55, resulting in a further increase in the percentage of vapor in the feed entering chamber 58. This increase in the vapor would cause an increase in pressure and finally an increased flow through line 72 and into separator 78; the resulting increase in pressure in separator 78 would cause an increase in the rate of liquid leaving separator 78 and a low liquid level would be reached at which time the liquid flow from separator 78 would be reduced or ceased, thus reducing the cooling of the fluid passing through flow path 74 of heat exchanger 75 and further resulting in an additional increase in separator 78. The reduction or elimination of withdrawal of liquid from chamber 58 would result in a reduction or elimination of the flow of cooling fluid through flow path 71 of heat exchanger 52, thus reducing further the liquefaction of the vapors in line 49. The elimination or reduction in cooling fluid also affects heat exchangers 33 and 13. The final result would be a shut down of the system.

Other prior art systems attempt to overcome these difficulties through the incorporation of elaborate bypass systems. However, in accordance with the present invention these difficulties can be eliminated and a flow can be maintained in all streams without incurring an excessive buildup in pressure and without the necessity of an elaborate and complicated bypass system.

In accordance with the invention the liquid from chamber 66 is withdrawn through line 68 and valve 69 at a rate controlled by a pressure recorder controller 151 responsive to the pressure in chamber 66; the vapors from chamber 58 are withdrawn through line 72 and valve 73 at a rate controlled by liquid level controller 153 responsive to the liquid level in chamber 58; while the vapors from chamber 66 are withdrawn through line 79 and admixed with the fluid in line 72 downstream of valve 73 and the resulting admixture is passed through line 76 and valve 77 into separator 78 at a rate determined by controller 154 which manipulates valve 77 responsive to the lower of a first signal representative of the pressure in separator 78 and a second signal representative of the liquid level in chamber 66 as determined by liquid level controller 150. Controller 154 can be any suitable device, such as a low pressure selector relay designated Moore Relay 61F and manufactured by Moore Products, Inc. of Philadelphia, Pa. Controller 154 is set so that during normal operation valve 77 will be actuated by liquid level controller 150 responsive to the liquid level in chamber 66, but during start up procedures or a system upset valve 77 will be actuated responsive to the pressure in separator 78. In a presently preferred embodiment the rate of withdrawal of vapors from separator 78 is controlled by valve 155 which is mounted in line 97 and which is actuated by liquid level controller 156 responsive to the liquid level in separator 78. Thus when the liquid level rises in separator 78, controller 156 closes valve 155 to increase the pressure in separator 78 and force liquid from separator 78 through line 80 at a higher rate. The rate of withdrawal of liquid from separator 78 is controlled by valve 157 which is located in line 80 and which is actuated by pressure recorder controller 158 responsive to the pressure in separator 78. It is also within the contemplation of the invention to provide line 159 communicating between lines 72 and 76 as a bypass for flow path 74 of heat exchanger 75. The rate of flow through line 159 can be regulated by valve 161 which is actuated by analyzer-controller 162 responsive to an analysis of the fluid passing through line 80. Thus the rate of flow of fluid through line 159 and thus the temperature of the fluid entering separator 78 can be manipulated responsive to the helium content of the fluid in line 80 to maintain said helium content below a predetermined value.

The following specific example is presented in further illustration of the invention but it is not to be construed to unduly limit the invention.

EXAMPLE I

A system in accordance with the drawing for the recovery of helium, nitrogen, a rich gas, a low B.t.u. gas, and a residue gas is operated under the conditions and results set forth in the following table.

The control system of the invention provides effective control during start up procedures as well as during system upsets, maintains a flow through all flow lines and at the same time prevents any excessive build up in pressure in the system, and provides an entirely automatic system without the necessity of utilizing complicated dual controls and bypass controls.

While the control system of the invention has been illustrated in combination with a helium recovery system the invention can be utilized in many gas separation systems for the recovery of gases other than helium. The control system of the invention can also be utilized where the vapor effluent from only one separator (such as chamber 66 or chamber 58) is introduced into a second column as feed thereto.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Thus, while the heat exchangers have been illustrated with one or two flow paths for each process line, it is obvious that any suitable number of flow paths can be utilized. While column 59 has been illustrated as having two separate chambers, a single chamber can be utilized. Suffice to say, the drawing is for illustrative purposes, as is the description thereof.

Table I

| Stream | He | N₂ | C₁ | C₂ | C₃ | C₄ | C₅ | Pressure, p.s.i.g. | Temperature, °F. | Flow Rate, lbs./hr. |
|---|---|---|---|---|---|---|---|---|---|---|
| 11 | 0.75 | 14.84 | 71.72 | 6.19 | 4.09 | 1.68 | 0.73 | 350 | 90 | 250,813 |
| 14 | 0.75 | 14.84 | 71.72 | 6.19 | 4.09 | 1.68 | 0.73 | 348 | −80 | 250,813 |
| 19 | | 1.40 | 26.52 | 21.24 | 30.37 | 14.07 | 6.40 | 350 | −80 | 50,305 |
| 23 | | 4.35 | 79.20 | 14.19 | 1.87 | 0.36 | 0.03 | 20 | −130.5 | 8,228 |
| 28 | | 0.03 | 2.07 | 24.51 | 43.60 | 20.44 | 9.35 | 20 | −130.5 | 42,077 |
| 29 | | 1.40 | 26.52 | 21.24 | 30.37 | 14.07 | 6.40 | 20 | 81 | 50,305 |
| 31 | 0.84 | 16.54 | 77.43 | 4.29 | 0.77 | 0.11 | 0.02 | 345 | −80 | 200,508 |
| 34 | 0.84 | 16.54 | 77.43 | 4.29 | 0.77 | 0.11 | 0.02 | 345 | −165 | 200,508 |
| 36 | 0.02 | 5.46 | 82.52 | 9.87 | 1.83 | 0.07 | 0.03 | 350 | −165 | 83,621 |
| 39 | 0.19 | 21.98 | 77.55 | 0.28 | | | | 225 | −180 | 7,596 |
| 40 | 0.01 | 16.04 | 83.60 | 0.35 | | | | 225 | −175 | 87,753 |
| 45 | | 3.81 | 83.02 | 10.82 | 2.02 | 0.30 | 0.03 | 225 | −180 | 76,025 |
| 46 | 0.01 | 10.99 | 83.14 | 4.88 | 0.84 | 0.12 | 0.01 | 225 | −90 | 171,044 |
| 48 | 0.01 | 10.98 | 83.09 | 4.90 | 0.88 | 0.13 | 0.01 | 225 | 81 | 171,374 |
| 49 | 1.44 | 24.51 | 73.77 | 0.28 | | | | 350 | −165 | 116,887 |
| 53 | 1.44 | 24.51 | 73.77 | 0.28 | | | | 350 | −197 | 116,887 |
| 57 | 1.44 | 24.51 | 73.77 | 0.28 | | | | 350 | −200 | 116,887 |
| 63 | 0.04 | 17.37 | 82.25 | 0.34 | | | | 226 | −211.5 | 91,193 |
| 65 | 0.04 | 17.37 | 82.25 | 0.34 | | | | 226 | −207.5 | 91,193 |
| 68 | 0.01 | 16.04 | 83.60 | 0.35 | | | | 225 | −207.5 | 87,753 |
| 72 | 7.38 | 55.01 | 37.61 | | | | | 225 | −212 | 25,694 |
| 70 | 1.14 | 56.67 | 42.19 | | | | | 225 | −207.5 | 3,440 |
| 76 | 6.69 | 55.64 | 37.67 | | | | | 225 | −289 | 29,134 |
| 80 | 0.03 | 57.68 | 42.29 | | | | | 75 | −295 | 26,829 |
| 82 | 0.03 | 57.68 | 42.29 | | | | | 75 | 219 | 26,829 |
| 84 | 0.03 | 57.68 | 42.29 | | | | | 75 | −175 | 26,829 |
| 86 | 0.03 | 57.68 | 42.29 | | | | | 75 | 90 | 26,829 |
| 98 | 0.03 | 57.68 | 42.29 | | | | | 75 | 81 | 26,829 |
| 88 | 55.01 | 40.83 | 4.16 | | | | | 75 | −295 | 2,305 |
| 91 | 55.01 | 40.83 | 4.16 | | | | | 75 | −219 | 2,305 |
| 93 | 55.01 | 40.83 | 4.16 | | | | | 75 | −175 | 2,305 |
| 95 | 55.01 | 40.83 | 4.16 | | | | | 75 | −90 | 2,305 |
| 97 | 55.01 | 40.83 | 4.16 | | | | | 75 | 81 | 2,305 |
| 99 | .03 | 50.40 | 49.57 | | | | | 75 | 81 | 846 |
| 101 | .03 | 50.40 | 49.57 | | | | | 213 | 275 | 846 |
| 103 | .03 | 50.40 | 49.57 | | | | | 210 | 90 | 846 |
| 106 | .03 | 50.40 | 49.57 | | | | | 205 | −218 | 846 |
| 108 | .03 | 50.40 | 49.57 | | | | | 75 | 81 | 25,983 |
| 112 | | 22.0 | 78.0 | | | | | 205 | −218 | 272 |
| 114 | | 31.47 | 68.53 | | | | | 73 | −241 | 510 |
| 115 | | 43.85 | 56.15 | | | | | 73 | −224 | 238 |
| 117 | | 31.47 | 68.53 | | | | | 70 | 83 | 510 |
| 119 | .047 | 67.80 | 32.153 | | | | | 205 | −218 | 574 |
| 122 | .047 | 67.80 | 32.153 | | | | | 200 | −247 | 574 |
| 126 | | 43.85 | 56.15 | | | | | 74 | −274 | 238 |
| 131 | .09 | 89.01 | 10.90 | | | | | 75 | −274 | 336 |
| 133 | .09 | 89.01 | 10.90 | | | | | 73 | −224 | 336 |
| 135 | .09 | 89.01 | 10.90 | | | | | 70 | 83 | 336 |
| 136 | .09 | 89.01 | 10.90 | | | | | 14 | 100 | 336 |

Reasonable variation and modification are possible within the scope of the disclosure, the drawing and the appended claims to the invention.

I claim:

1. A process for the separation of a mixture of gases comprising passing the mixture through a first heat exchanging zone to cool said mixture, passing the thus cooled mixture through a second heat exchanging zone to further cool said thus cooled mixture, the temperature of the thus further cooled mixture being sufficiently low to liquefy a portion of said thus further cooled mixture, passing said thus further cooled mixture into a first separation zone, removing liquid from said first separation zone, passing the thus removed liquid from said first separation zone through said second heat exchanging zone in indirect heat exchanging relationship with said thus cooled mixture and then into a second separation zone, establishing a first signal representative of the pressure in said second separation zone, removing liquid from said second separation zone at a rate responsive to said first signal, passing the thus removed liquid from said second separation zone through said first heat exchanging zone in indirect heat exchanging relationship with said mixture, establishing a second signal representative of the liquid level in said first separation zone, withdrawing uncondensed gases from said first separation zone at a rate responsive to said second signal, withdrawing uncondensed gases from said second separation zone, admixing the thus withdrawn gases from said first separation zone with the thus withdrawn gases from said second separation zone, passing the resulting admixture through a third heat exchanging zone to cool said admixture to liquefy a portion of said admixture, reducing the pressure of the thus cooled admixture, introducing the thus expanded admixture into a third separation zone, withdrawing liquid from said third separation zone, passing the thus withdrawn liquid from said third separation zone through said third heat exchanging zone in indirect heat exchanging relationship with said admixture and then through said first heat exchanging zone in indirect heat exchanging relationship with said mixture, withdrawing uncondensed gases from said third separation zone, passing the thus withdrawn gases from said third separation zone through said third heat exchanging zone in indirect heat exchanging relationship with said admixture and then through said first heat exchanging zone in indirect heat exchanging relationship with said mixture, establishing a third signal representative of the liquid level in said second separation zone, establishing a fourth signal representative of the pressure in said third separation zone, and controlling the rate of flow of said admixture responsive to the one of said third and fourth signals having the lower value.

2. A process in accordance with claim 1 further comprising establishing a fifth signal representative of the liquid level in said third separation zone, controlling the rate of withdrawal of uncondensed gases from said third separation zone responsive to said fifth signal, and controlling the rate of withdrawal of liquid from said third separation zone responsive to said fourth signal.

3. A process in accordance with claim 1 wherein said mixture of gases is a helium containing natural gas.

4. A process for the separation of a mixture of gases comprising passing the mixture through a first heat exchanging zone to liquefy a portion of said mixture, introducing the thus cooled mixture into a first separation zone, removing liquid from said first separation zone, removing uncondensed gases from said first separation zone, cooling the thus withdrawn uncondensed gases to liquefy a portion thereof, introducing the resulting cooled fluid into a second separation zone, establishing a first signal representative of the liquid level in said first separation zone, establishing a second signal representative of the pressure in said second separation zone, controlling the rate of introduction of the cooled fluid into said second separation zone responsive to the one of said first and second signals having the lower value, establishing a third signal representative of the pressure in said first separation zone, and controlling the rate of withdrawal of liquid from said first separation zone responsive to said third signal.

5. A process for the separation of a mixture of gases comprising passing the mixture through a first heat exchanging zone to liquefy a portion of said mixture, introducing the thus cooled mixture into a first separation zone, removing liquid from said first separation zone, removing uncondensed gases from said first separation zone, cooling the thus withdrawn uncondensed gases to liquefy a portion thereof, introducing the resulting cooled fluid into a second separation zone, establishing a first signal representative of the liquid level in said first separation zone, establishing a second signal representative of the pressure in said second separation zone, controlling the rate of introduction of the cooled fluid into said second separation zone responsive to said first signal during normal operations and responsive to said second signal during start up procedures and during system upsets.

6. A process for the separation of a mixture of gases comprising cooling said mixture to liquefy a portion thereof, passing the thus cooled mixture into a first separation zone, removing liquid from said first separation zone, heating the thus removed liquid from said first separation zone, passing the thus heated liquid into a second separation zone, establishing a first signal representative of the pressure in said second separation zone, removing liquid from said second separation zone at a rate responsive to said first signal, establishing a second signal representative of the liquid level in said first separation zone, withdrawing uncondensed gases from said first separation zone at a rate responsive to said second signal, withdrawing uncondensed gases from said second separation zone, admixing the thus withdrawn gases from said first separation zone with the thus withdrawn gases from said second separation zone, cooling the resulting admixture to liquefy a portion of said admixture, introducing the thus cooled admixture into a third separation zone, withdrawing liquid from said third separation zone, withdrawing uncondensed gases from said third separation zone, establishing a third signal representative of the liquid level in said second separation zone, establishing a fourth signal representative of the pressure in said third separation zone, and controlling the rate of flow of said admixture responsive to the one of said third and fourth signals having the lower value.

7. Apparatus for the separation of a mixture of gases comprising means for cooling said mixture, a first liquid gas separator, means for introducing the thus cooled mixture into said first liquid gas separator, means for removing liquid from said first liquid gas separator, means for establishing a first signal representative of the pressure in said first liquid gas separator, means for controlling the rate of removal of liquid from said first liquid gas separator responsive to said first signal, means for withdrawing uncondensed gases from said first liquid gas separator, means for cooling the thus withdrawn uncondensed gases, a second liquid gas separator, means for introducing the thus cooled gases into said second liquid gas separator, means for establishing a second signal representative of the liquid level in said first liquid gas separator, means for removing liquid from said second liquid gas separator, means for establishing a third signal representative of the pressure in said second liquid gas separator, means for manipulating the rate of flow of said thus cooled gases into said second liquid gas separator responsive to the one of said second and third signals having the lower value.

8. Apparatus in accordance with claim 7 wherein said means for manipulating comprises a low pressure selector relay.

9. Apparatus for the separation of a mixture of gases comprising a first heat exchanger, means for passing the mixture through said first heat exchanger to cool said mixture, a second heat exchanger, means for passing the thus cooled mixture through said second heat exchanger to further cool said thus cooled mixture, the temperature of the thus further cooled mixture being sufficiently low to liquefy a portion of said thus further cooled mixture, a first liquid gas sepaartor, means for passing said thus further cooled mixture into said first liquid gas separator, means for removing liquid from said first liquid gas separator, a second liquid gas separator, means for passing the thus removed liquid from said first liquid gas separator through said second heat exchanger in indirect heat exchanging relationship with said thus cooled mixture and then into said second liquid gas separator, means for establishing a first signal representative of the pressure in said second liquid gas separator, means for removing liquid from said second liquid gas separator at a rate responsive to said first signal, means for passing the thus removed liquid from said second liquid gas separator through said first heat exchanger in indirect heat exchanging relationship with said mixture, means for establishing a second signal representative of the liquid level in said first liquid gas separator, means for withdrawing uncondensed gases from said first liquid gas separator at a rate responsive to said second signal, means for withdrawing uncondensed gases from said second liquid gas separator, means for admixing the thus withdrawn gases from said first liquid gas separator with the thus withdrawn gases from said second liquid gas separator, a third heat exchanger, means for passing the resulting admixture through said third heat exchanger to cool said admixture, a throttling valve for reducing the pressure of the thus cooled admixture, a third liquid gas separator, means for passing the thus cooled admixture through said throttling valve and introducing the thus expanded admixture into said third liquid gas separator, means for withdrawing liquid from said third liquid gas separator, means for passing the thus withdrawn liquid from said third liquid gas separator through said third heat exchanger in indirect heat exchanging relationship with said admixture and then through said first heat exchanger in indirect heat exchanging relationship with said mixture, means for withdrawing uncondensed gases from said third liquid gas separator, means for passing the thus withdrawn gases from said third liquid gas separator through said third heat exchanger in indirect heat exchanging relationship with said admixture and then through said first heat exchanger in indirect heat exchanging relationship with said mixture, means for establishing a third signal representative of the liquid level in said second liquid gas separator, means for establishing a fourth signal representative of the pressure in said third liquid gas separator, and means for controlling said throttling valve responsive to the one of said third and fourth signals having the lower value.

10. Apparatus in accordance with claim 9 further comprising means for establishing a fifth signal representative of the liquid level in said third liquid gas separator, means for controlling the rate of withdrawal of uncondensed gases from said third liquid gas separator responsive to said fifth signal, and means for controlling the rate of withdrawal of liquid from said third liquid gas separator responsive to said fourth signal.

11. Apparatus for the separation of a mixture of gases comprising means for cooling said mixture to liquefy a portion thereof, a first liquid gas separator, means for introducing the thus cooled mixture into said first liquid gas separator, a second liquid gas separator, means for removing liquid from said first liquid gas separator, means for heating the thus removed liquid from said first liquid gas separator, means for introducing the thus heated liquid into said second liquid gas separator, means for establishing a first signal representative of the pressure in said second liquid gas separator, means for removing liquid from said second liquid gas separator at a rate responsive to said first signal, means for establishing a second signal representative of the liquid level in said first liquid gas separator, means for withdrawing uncondensed gases from said first liquid gas separator, means for withdrawing uncondensed gases from said second liquid gas separator, means for admixing the thus withdrawn gases from said first and second liquid gas separators, means for cooling the resulting admixture to liquefy a portion thereof, a third liquid gas separator, means for introducing the thus cooled admixture into said third liquid gas separator, means for establishing a third signal representative of the liquid level in said second liquid gas separator, means for establishing a fourth signal representative of the pressure in said third liquid gas separator, means for controlling the rate of flow of said admixture into said third liquid gas separator responsive to the one of said third and fourth signals having the lower value.

12. Apparatus for the separation of a mixture of gases comprising means for cooling said mixture, a first liquid gas separator, means for introducing the thus cooled mixture into said first liquid gas separator, means for removing liquid from said first liquid gas separator, means for withdrawing uncondensed gases from said first liquid gas separator, means for cooling the thus withdrawn uncondensed gases, a second liquid gas separator, means for introducing the thus cooled gases into said second liquid gas separator, means for removing liquid from said second liquid gas separator, means for establishing a first signal representative of the liquid level in said first liquid gas separator, means for establishing a second signal representative of the pressure in said second liquid gas separator, means for manipulating the rate of flow of said thus cooled gases into said second liquid gas separator responsive to the one of said first and second signals having the lower value.

References Cited in the file of this patent
UNITED STATES PATENTS

| | | |
|---|---|---|
| 2,071,429 | Ragatz | Feb. 23, 1937 |
| 2,225,949 | Bennett | Dec. 24, 1940 |
| 2,389,244 | Whaley | Nov. 20, 1945 |
| 2,768,703 | Parks | Oct. 30, 1956 |
| 2,882,693 | Clay | Apr. 21, 1959 |
| 2,900,312 | Gilmore | Aug. 18, 1959 |
| 3,026,682 | Palazzo et al. | Mar. 27, 1962 |
| 3,034,307 | Berger | May 15, 1962 |